United States Patent [19]

Trufyn

[11] Patent Number: 4,553,202
[45] Date of Patent: Nov. 12, 1985

[54] USER CONTROLLED DIALOG RESOURCE SWITCHING IN A MULTI-TASKING WORD PROCESSOR

[75] Inventor: Nicholas Trufyn, San Jose, Calif.

[73] Assignee: International Business Machines Corporation, Armonk, N.Y.

[21] Appl. No.: 375,432

[22] Filed: May 6, 1982

[51] Int. Cl.⁴ .............................................. G06F 9/46
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,145,739 | 3/1979 | Dunning et al. | 364/200 |
| 4,149,243 | 4/1979 | Wallis | 364/200 |
| 4,152,761 | 5/1979 | Louie | 364/200 |
| 4,225,922 | 9/1980 | Porter | 364/200 |
| 4,229,790 | 10/1980 | Gilliland et al. | 364/200 |
| 4,247,906 | 1/1981 | Corwin et al. | 364/900 |
| 4,384,324 | 5/1983 | Kim et al. | 364/200 |
| 4,403,288 | 9/1983 | Christian et al. | 364/200 |
| 4,435,780 | 3/1984 | Herrington et al. | 364/900 |

*Primary Examiner*—Jerry Smith
*Assistant Examiner*—Gary V. Harkcom
*Attorney, Agent, or Firm*—R. Bruce Brodie

[57] ABSTRACT

User actuates real time resource reallocation in a multi-tasking environment wherein the operating system builds a process queue against a resource and wherein a new task is interrupt invoked with the dispatcher allocating the resource to the next task in the queue, the queue switching being orthogonol to the dispatcher scheduling of processes.

3 Claims, 10 Drawing Figures

THE DIALOG RESOURCE SWAP LIST

```
IPCB     DSECT
IPCBUSER DS    XL4              FIELD AVAILABLE TO THE USER
          .
          .
          .
IPCBWQ   DS    AL2              2 BYTE OFFSET OF 1ST WORK REQUEST
IPCBFREE DS    AL2              2 BYTE OFFSET OF 1ST FREE ACB
IPCBDSB  DS    AL2              A (DISPLAY BUFFER)
IPCBIDRR DS    AL2              A (DISPLAY CONTROL BLOCK)
IPCBIUCK DS    AL2              A (KEYBOARD CONTROL BLOCK)
IPCBAPSL BIT   B'10000000       APPLICATION SELECTION PROCESS
*IPCBAPSL ON =>     APPLICATION SELECTION PROCESS
IPCBSWAP BIT   B'01000000'      PROCESS GETS KEYBOARD OWNERSHIP
*IPCBSWAP ON =>     PROCESS GETS KEYBOARD OWNERSHIP
IPCBLDHD BIT   B'00100000'      ANCHOR FOR APPLICATION PROCESS(ES)
*IPCBLDHD ON =>     ANCHOR FOR APPLICATION PROCESS(ES)
IPCBSTA2 BYTE                   SECOND STATUS BYTE
IPCBOVLN DS    X                MESSAGE OVERLAY NUMBER
IPCBPSWL DS    AL2              A (PREVIOUS PROCESS ON SWAP LIST)
IPCBNSWL DS    AL2              A (NEXT PROCESS ON SWAP LIST)
         DS    XL4              RESERVED
```

PROCESS CONTROL BLOCK TO ALLOW DIALOG RESOURCE ALLOCATION

FIG. 4

THE DIALOG RESOURCE SWAP LIST

FIG. 5

THE DIALOG RESOURCE SWAP LIST

FIG. 6

PSEUDOCODE

BEGIN (LOAD PROCESS SERVICE ROUTINE)
1. SAVE WORK REGISTERS
1. LOAD THE CSECT CONTAINING THE PROCESS IN LONG-TERM STORAGE

.

.

.

3. . . IF THE PROCESS IS A NORMAL PROCESS THEN
4. . . . SAVE REGISTERS IN DISPATCHER ORDER TO PREPARE FOR
           INSERTING THE LOADED PROCESS ON THE READY QUEUE
4. . . . ADD THE NEW PROCESS TO SWAP QUEUE
4. . . . IF ECB IS SPECIFIED THEN
5. . . . . GET THE PROCESS TO BE POSTED
5. . . . . STORE THE ECB ADDRESS AND THE PROCESS IN THE REGISTERS
           OF THE PROCESS BEING LOADED
4. . . . ENDIF
4. . . . JUMP TO THE INSERT ROUTINE TO INSERT THE LOADED PROCESS
           ON THE READY LIST. THE INSERT ROUTINE CALLS THE DISPATCHER
           THE HIGHEST PRIORITY READY PROCESS.

.

.

.

1. RESTORE WORK REGISTERS
1. RETURN TO THE CALLER
END (LOAD PROCESS SERVICE ROUTINE)
END PSEUDOCODE-***********************************************************

LOAD PROCESS SERVICE ROUTINE
TO BUILD A RESOURCE SWAP QUEUE

FIG. 7

```
5. . . . . IF (CODE KEY AND ENTER IS ON), THEN
6. . . . . . SAVE THE ACCUMULATOR
6. . . . . . SWAP KEYBOARD/DISPLAY RESOURCE TO NEXT PROCESS
6. . . . . . THROW AWAY KEYSTROKE
6. . . . . . RESTORE THE ACCUMULATOR
6. . . . . . IF (IMMEDIATE MSG BIT SET), THEN
7. . . . . . . SET UP ID BYTE FOR MSG SERVICES ACALL
7. . . . . . . ACALL OF MESSAGE SERVICES ROUTINE
6. . . . . . ENDIF
5. . . . . ELSE
6. . . . . . IF (SPECIAL KEYS), THEN
7. . . . . . . DO AUDIO FEEDBACK
7. . . . . . . PREPARE ACALL FOR MSG KEY
7. . . . . . . IF (REPLY KEY), THEN
8. . . . . . . . PREPARE ACALL REPLY KEY
7. . . . . . . ENDIF
7. . . . . . . ACALL OF MESSAGE SERVICES ROUTINE
6. . . . . . ELSE (NOT A SPECIAL KEY)
7. . . . . . . IF (IMMEDIATE MSG BIT SET), THEN
8. . . . . . . . SET UP ID BYTE FOR MSG SERVICES ACALL
8. . . . . . . . ACALL OF MESSAGE SERVICES ROUTINE
7. . . . . . . ENDIF
8. . . . . . . . IF (HARDWARE OVERRUN), THEN
8. . . . . . . . CHANGE POINTER SO CODE POINT WILL FIT IN QUEUE
9. . . . . . . . . PLACE HARDWARE OVERRUN IN QUEUE
8. . . . . . . . ELSE (NOT HDWR OVERRUN)
9. . . . . . . . . SET ON SOFTWARE OVERRUN FLAG
8. . . . . . . . ENDIF
7. . . . . . . ELSE (QUEUE NOT FULL)
8. . . . . . . . DO QUEUE ROUTINE
7. . . . . . . ENDIF
6. . . . . . ENDIF
```

IMPLEMENTATION OF THE CODE-ENTER "HOT KEY"
TO EXECUTE THE RESOURCE SWAP SERVICE
ROUTINE (SPCRSWAP)

```
SAVE WORK REGISTERS
OFFSET TO PARAMETER ON THE STACK
ERROR IF PID = 0
CALL COMMON PCB LOOKUP ROUTINE
ERROR IF PROCESS IS NOT LOADED
SET NORMAL COMPLETION RETURN CODE
GET THE REQUEST TYPE FLAGS
IF ADD TYPE, THEN
1. . SET ADDRESSABILITY TO CALLER'S PCB
1. . IF NEXT AND PREVIOUS ADDRESS IS ZERO, THEN
2. . . SET THE CURRENT PCB ADDRESS TO ESTABLISH FIRST LINK
1. . ENDIF
1. . INSERT THE NEW PCB AFTER THE CALLER'S PCB
1. . IF THIS IS LOADED BY APPLICATION SELECTION, THEN
2. . . SET AS THE APPLICATION ANCHOR AND SWAPPABLE (FOR NOW)
2. . . GET MEMORY TO HOLD KEYBOARD UCB
2. . . ERROR IF NO SPACE FOR BUFFER
2. . . COPY THE CURRENT IUCK (LDPROC TIME)
2. . . SET PID OF KEYBOARD OWNER
2. . . GET MEMORY TO HOLD DISPLAY RESERVED AREA
2. . . ERROR IF NO SPACE FOR BUFFER
2. . . LOCK THE DISPLAY
2. . . COPY THE CURRENT IDDR AND SET REFRESH BUFFER ADDRESS
2. . . UNLOCK THE DISPLAY
1. . ELSE
2. . . LOCK THE DISPLAY
2. . . COPY THE UCK, DRR AND DISPLAY BUFFER ADDRESS FROM
         CALLER'S PCB
2. . . UNLOCK THE DISPLAY
1. . ENDIF
ELSE
1. . IF DELETE TYPE, THEN
2. . . DELETE THE SPECIFIED PCB FROM SWAP CHAIN
2. . . IF PROCESS IS SWAPPABLE, THEN
3. . . . FREE THE IDRR AND THE IUCK
2. . . ENDIF
1. . ELSE
2. . . IF CURRENT TYPE, OR IF NEXT TYPE, THEN
3. . . . IF NEXT TYPE, THEN
4. . . . . ERROR IF NO PROCESSES ON SWAP CHAIN
4. . . . . GET NEXT PCB ON SWAP CHAIN
4. . . . . WHILE PROCESS NOT ACTIVE OR WHILE PROCESS NOT
             SWAPPABLE, DO
5. . . . . . GET NEXT PCB ON SWAP CHAIN
4. . . . . ENDDO
3. . . . ENDIF
3. . . . IF PROCESS (ACTIVE OR BEING LOADED) AND IF PROCESS
           IS SWAPPABLE, THEN
4. . . . . SET ADDRESSABILITY TO IUCK FROM ICVT
4. . . . . GET PID OF KEYBOARD OWNER
4. . . . . GET PCB ADDRESS OF KEYBOARD OWNER
4. . . . . ERROR IF ALREADY OWNED BY SPECIFIED PROCESS
4. . . . . GET MEMORY TO HOLD REFRESH BUFFER (SMALL DISPLAY)
4. . . . . ERROR IF NO SPACE FOR BUFFER
4. . . . . LOCK THE DISPLAY
4. . . . . COPY THE REFRESH BUFFER
4. . . . . MAKE SURE PROCESSES LOADED BY THIS PROCESS HAVE
             THE REFRESH BUFFER ADDRESS CHANGED ALSO
4. . . . . UNLOCK THE DISPLAY
4. . . . . GET CURRENT KEYBOARD STATUS
4. . . . . SET PROPER ADDRESSES OF IUCK AND IDDR IN THE CVT
             AND SET CURRENT KEYBOARD STATUS
4. . . . . IF NEW OWNER HAS A SAVED REFRESH BUFFER, THEN
5. . . . . . LOCK THE DISPLAY
5. . . . . . COPY BACK INTO THE REFRESH BUFFER (EXCEPT FOR
               LINE 25)
5. . . . . . FREE THE REFRESH BUFFER SAVE AREA
5. . . . . . MAKE SURE PROCESSES LOADED BY NEW PROCESS HAVE
               THE REFRESH BUFFER ADDRESS CHANGED ALSO
5. . . . . . UNLOCK THE DISPLAY
4. . . . . ENDIF
3. . . . ELSE
4. . . . . SET RETURN CODE TO NOT AVAILABLE FOR SWAP
3. . . . ENDIF
2. . . ENDIF
1. . ENDIF
ENDIF
RESTORE WORK REGISTERS
RETURN TO PROCESS ISSUING RESWAP REQUEST
```

```
4. . . . IF THE CALLER IS CURRENT OWNER
5. . . . . SWAP TO CALLED PROCESS
4. . . . ENDIF
```

UPON RETURN FROM THE PRIMARY PROCESS, SWAP RESOURCES BACK TO THE CALLER. THIS IS DONE ONLY IF THE PROCESS HANDLED BY THIS DRIVER IS THE APPLICATION PROCESS ANCHOR.

```
4. . . . IF THIS PROCESS IS THE ANCHOR
5. . . . . SWAP RESOURCES TO CALLING PROC.
4. . . . ENDIF
```

PROCESS DRIVER

USER CONTROLLED DIALOG RESOURCE SWITCHING IN A MULTI-TASKING WORD PROCESSOR

TECHNICAL FIELD

This invention relates to word processing and, more particularly, to an interactive method for reassigning keyboard and display resources among asynchronous concurrently executing tasks.

BACKGROUND

Dialog resources are facilities permitting operator/machine communication. In multi-tasking word or data processing work stations, they are allocated to tasks (processes) for longer time relative to other resources such as the microprocessor, DASD, and the like. Examples of microcomputer controlled work stations with dialog resources abound. Corwin, U.S. Pat. No. 4,247,906, issued Jan. 27, 1981 and IBM 6580 DISPLAYWRITER illustrate word processing while the IBM 3277 typifies data processing. Relatedly, there are differences in the functions performed by the work station types. For example, the IBM 3277 is a data processing work station exemplified by remote tasking at a host and an interactive relation between the host and terminal. In contrast, the IBM 6580 DISPLAYWRITER executes stand-alone local tasking with only an occasional remote transmission to a host.

An operator key entering a text on a word processor (IBM 6580) and desiring a name and address reference is presently required to suspend entry at the DISPLAYWRITER and invoke data base access by way of the separate keyboard and display of the 3277. To facilitate both remote and local tasking using a single terminal, it is well appreciated within the art to emulate a remote communicating terminal such as the 3277 on the same microprocessor that supports word processing. Indeed, operating systems that give the appearance of executing asynchronous tasks concurrently are well described in U.S. Pat. No. 4,435,780 issued Mar. 6, 1984, to Harrington, et al, entitled "Dispatching Multiple Processes" and Harrington, U.S. Ser. No. 208,621, filed Nov. 20, 1980, entitled "Queuing of Work Requests to Independent Tasks". What is absent from the art is a teaching of an operating system technique to effectuate real time switching of resources among multiple tasks without interference in the execution of any single task. Louie, U.S. Pat. No. 4,152,761, discloses a digital processor programmed to perform multi-tasks which includes a hardware dispatcher for selecting tasks. The dispatcher receives the plurality of dispatcher requests, determines the highest priority request and selects the appropriate program routine. Louie teaches the binding of active tasks for purposes of task switching on a CPU demand basis. The link list represents a queue of active tasks that are sharing the CPU resource, but it has no relationship to task switching at the demand of the user.

THE INVENTION

In prior art interactive systems, dialog resources such as a keyboard or display were bound to a process (task) until the process terminated. That is, at task initiation the resource was reserved and continued until process termination when it was released. In this context, the technical problem solved by the method of this invention is the user initiated unbinding of dialog resources in a multi-tasking environment and reassigning of them to other tasks independent of the concurrency scheduling among READY/WAITING tasks.

The method steps include forming a queue of processes requiring dialog resources and embedding pointers defining an ordering in the counterpart process description; and then responsive to entry of the keystroke interrupt, causing the dispatcher to save the state vector of the currently executing process in its process description, retrieve the state vector of the next process in the queue in pointer order from its counterpart description, and transfer control to said retrieved process while permitting the continued processing of the entity relieved of the dialog resources.

Advantageously, this invention permits user notification during the status change in the dialog resources for processes other than the one currently selected by the user. Further, the method can be specifically utilized on one or more processes which involve external communication. Lastly, the method permits user scheduling of dialog resources independent of operating system scheduling of computing and other I/O sources.

DESCRIPTION OF THE PREFERRED EMBODIMENT AND INDUSTRIAL APPLICABILITY

Brief System Machine Description

Figure 1:
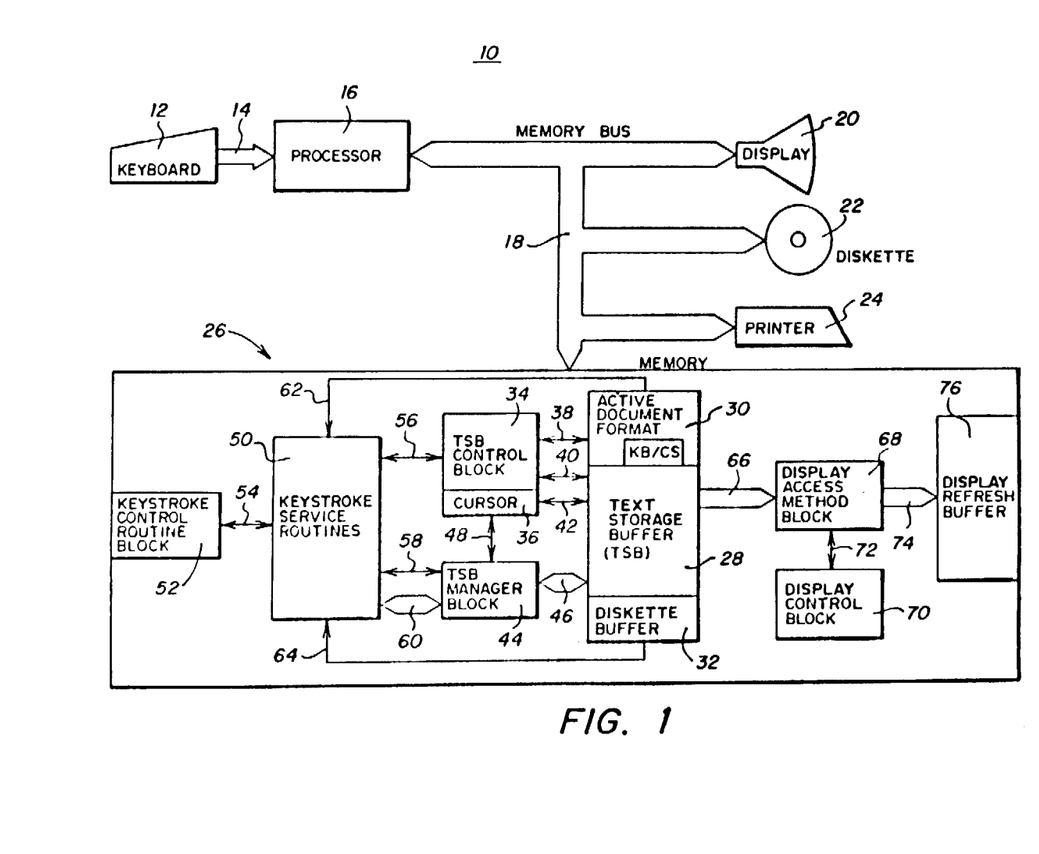
FIG. 1 depicts a word processor configuration including soft and hard copy output facilities, internal and external memory, and a bus coupling a microprocessor and keyboard input.

Referring now to FIG. 1, there is shown a word processing system 10 which includes a keyboard 12 for receiving text character entries and transmitting the text through a path 14 to a microprocessor 16. A memory bus 18 couples processor 16 to a CRT display 20, a diskette drive 22, a printer 24, and a random access memory 26.

An operator enters a text stream through the keyboard 12. Each page of text is stored and processed in the memory 26. As the text stream is received in the memory, it is simultaneously presented to display 20. After the buffering of the text in text storage buffer 28 of memory 26, the stream can be saved on diskettes 22 or hard copy printed out on printer 24.

Memory 26 includes a number of data areas and functional programs for operating with the text stored in system 10. The text and related control functions are saved in a text storage buffer 28 which includes an active format storage section 30 and a diskette buffer 32. The keyboard character set (KB/CS) for the documenting process is available in the active format section 30.

As each character is entered through the keyboard 12, it is processed by one or more keystroke service routines stored in memory 26 as executed by processor 16. The text stream is stored in the TSB 28, is simultaneously entered into display refresh buffer 76. This buffer drives display 20. The display control block (DCB) 70 and the display access method block 68 provide a window which may be scrolled relative to the contents of the TSB 28. It should be noted that both the diskette 22 and printer 24 have dedicated buffer areas assigned thereto. In this regard, block 70 serves to store flags and status information as required by the operation of block 68.

As the operator enters each keystroke at keyboard 12, a corresponding signal is transmitted to processor 16 over path 14 which enters the keystroke command in the memory 26. Upon receipt, the keystroke routine is invoked for block 50 in order to process the keyed command. This command is executed by processor 16 according to whether it is a control command or a graphic entry. The processing result is entered into TSB 28. While graphics and commands are built up in TSB 28, the text information is retained in display refresh buffer 76 and presented on display 20.

Through the control command, the operator can transfer information about the memory, display, diskette and printer. Selected pages can be pulled from the diskette 22 and the memory 26 so that the operator can make changes and corrections to the text and then reenter the corrected text into diskette 22 or have the corrected text hard copied on printer 24.

Partial Machine Register Organization, Data, and Control Flow

Figure 2:
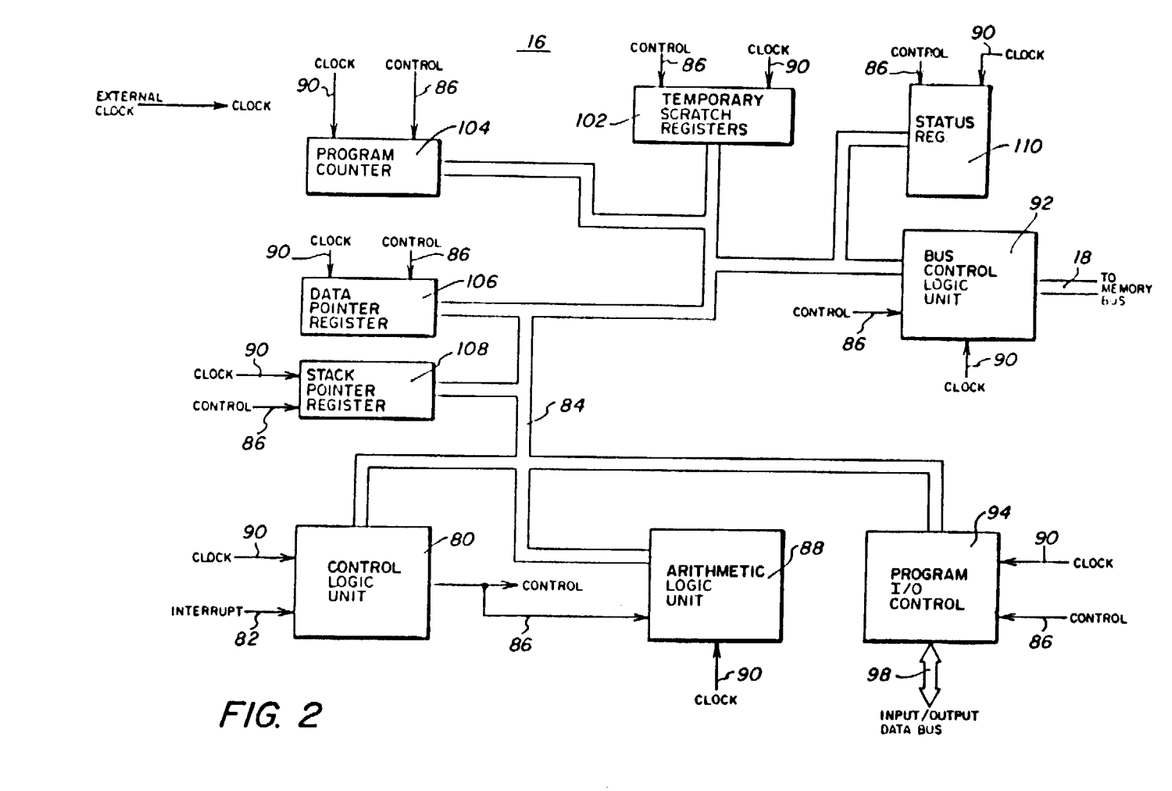
FIG. 2 delineates the partial register organization of the microprocessor shown in FIG. 1.

Referring now to FIG. 2, there is illustrated the contemporary machine register organization of processor 16. Such a processor may be commercially implemented as for example by an INTEL Corporation microprocessor model 8086. According to FIG. 2, the processor includes a control logic unit 80, which responds to an interrupt on a device bus 82 from keyboard 12. Logic unit 80 is also connected to a data and address bus 84 intercoupling other logic elements.

In response to a FETCH instruction from a random access memory 26, logic unit 80 generates control signals to other elements. The signals are coupled by way of path 86, illustratively connecting ALU 88. Synchronous operation of unit 80 and other logic elements is ensured by way of clock pulses from an external clock source transmitted over buffer 90. Data and instructions to be processed by processor 16 are entered over logic unit 92. Data also may be entered by way of a programmed input/output logic 94. Also, logic 92 couples storage elements of RAM 26 and receives instructions by processing data from the I/O control 94 or from RAM 26.

Device control information from processor 16 is passed by I/O control unit 94 and path 98. Input on the data bus 98 from keyboard 12 is processed internally through processor 16 by instructions over bus 84 to logic unit 80 by ALU 88. The ALU in response to a signal on path 88 and in accordance with instructions received on bus 18 executes arithmetic operations stored in temporary register 102.

Aspects of Concurrency

Generally a process is represented by a process descriptor (control block, state vector) which is treated both as a data structure and as the name of a reserved area of memory. As a data structure, a process descriptor includes the process name, status, and indications of its volatile environment. The volatile environment is that subset of the modifiable shared facilities of the system that are accessed by the process.

For purposes of this invention, the operating system includes the following constructs: a first level interrupt handler, a dispatcher, and interprocess communication primitives. The interrupt handler saves the value of the instruction counter for the currently executing process and transfers control to a fixed location in memory. The dispatcher decides which process will run next and establishes in the instruction counter the address of the next instruction to be executed. Lastly, the synchronization primitives permit interprocess communication and facilitate scheduling of processes and resources.

For this invention, a process is a functional unit consisting of a predefined stack, a primary program, and a process control block (PCB). A process is an entity that is used by the dispatching mechanism to schedule work within the system. Each process is executed asynchronous to all other processes. The dispatching priority of a process is used to determine the priority of that process relative to the priority of other processes in the system. In this regard, the process with the highest dispatching priority that is eligible for execution will be the process that is dispatched. In this environment, a process may exist in one of several states. These are primarily a wait, ready, or running. A process is considered to be in a WAIT state when awaiting the completion of an event or waiting for a resource to be released, or waiting for a work request. In the READY state, a process has been loaded and is eligible to be dispatched but is not currently the highest priority process. Lastly, a process in the RUNNING state is currently the highest priority process in the READY state. It has been loaded and is eligible to be dispatched.

Each process is associated with a primary control section of memory and is described by the process control block (PCB). The PCB is the central repository of information about a process and it is the focal point of communication with other processes. Any executing process will execute one work request to completion before beginning execution of the next work queued to that process.

For concurrent execution to truly occur, each process would have to have its own processor. Since word processors usually have only one microprocessing element, concurrent execution must be simulated. That is, the system executes only one process at a time but coordinates process execution to achieve the appearance of concurrency. Once a process has been started it either runs to completion, runs until it must wait for another process to do something, or runs until it is interrupted. When one of these events happens, the processor is given to the waiting process with the highest priority.

As previously mentioned, the dispatcher is an operating system construct which controls the rate of progress of processes in a mix by determining the frequency with which they will be given control and the length of time they will be allowed to maintain control. Round robin dispatching associates a time interval with the execution of a process. At the end of this interval (time slice), a successor process is started for an identical period. The dispatcher cycles around the queue giving each process exactly the same share of processor time at a fixed interval. This may be elaborated by changing the amount of time given to a process on the basis of priority. An alternative to time slicing is "work slicing". This relies upon at least one I/O operation in order to relinquish control. Since the execution of a SEEK command to a DASD is in the order of milliseconds then the disconnected mode operation of DASD arm dispatching permits the microprocessor to be reassigned until the SEEK is completed. This initiates a hardware interrupt causing a switchback to the requesting process. Work slicing is not effective where a process is compute bound such as in altering the values of a large array.

Control Block Structures

Figure 3:
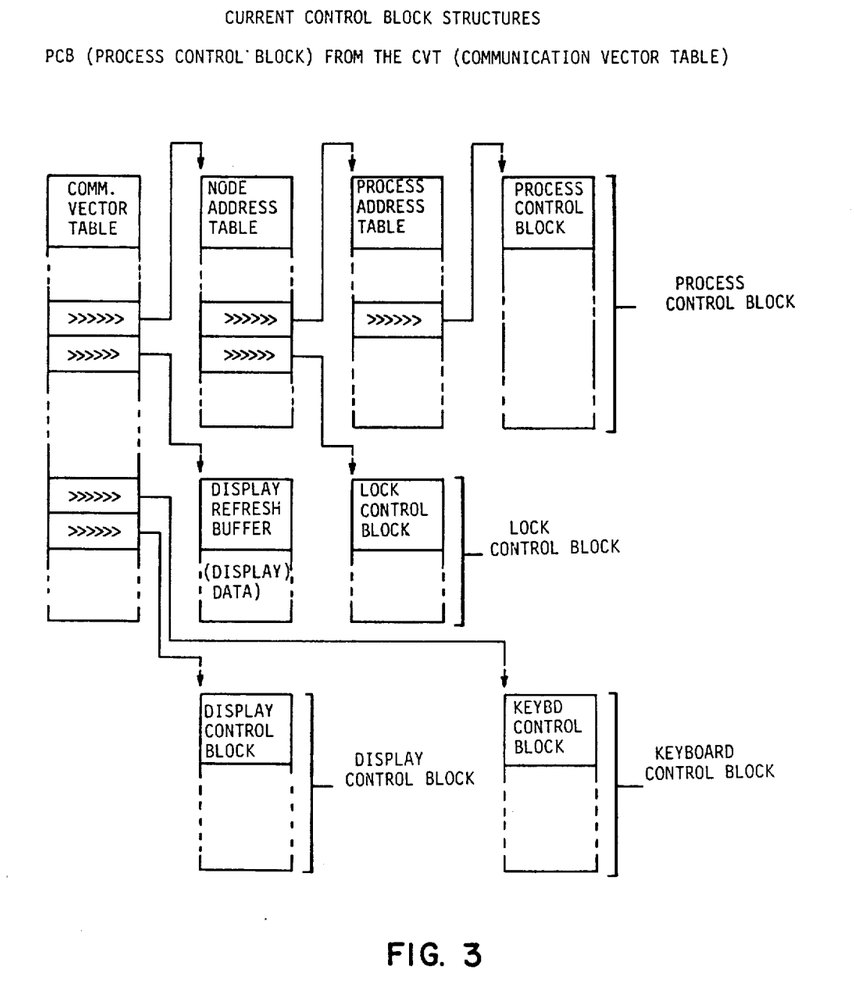
FIG. 3 depicts the state vector organization in terms of process description, I/O states, resource queues, and synchronization controls.
Figure 4:
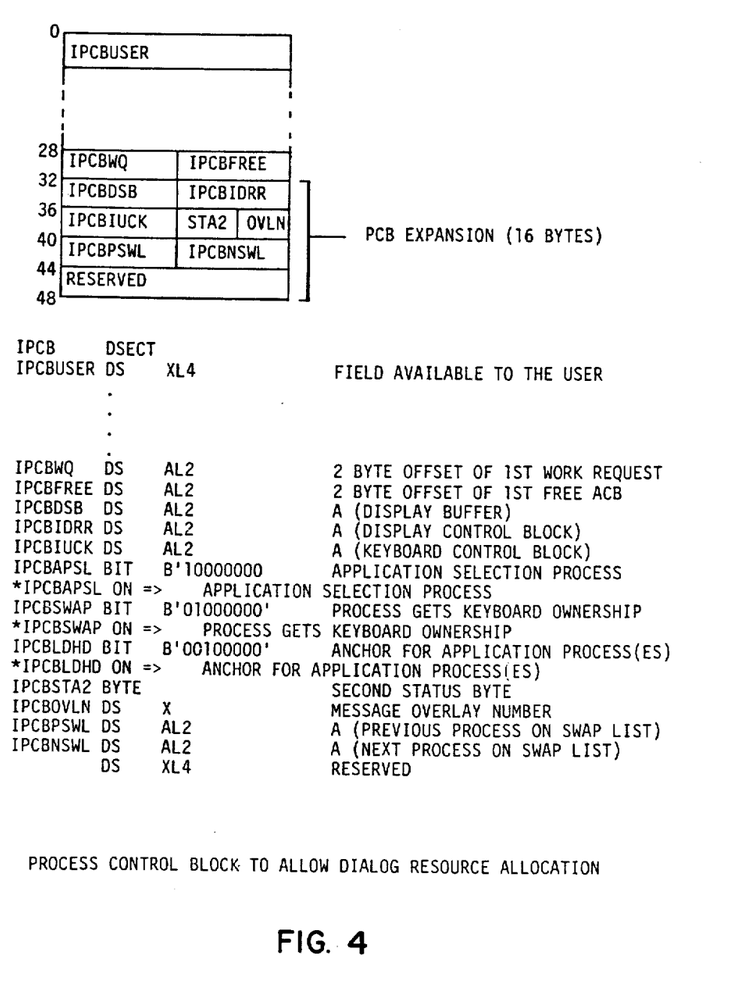
FIG. 4 shows a process control block description expanded to include dialog resource allocation.

Referring to FIGS. 3 and 4, there is depicted the relationship between the operating system information necessary to control, constitute, and reconstitute a multi-tasking environment. This takes the form of tables of name and location pointers, status, and saved register contents.

Referring now to FIG. 3, there is shown a communication vector table which holds all information that is global to the operating system. It includes a node address table associated with the physical address of a processor and holds a pointer to the process address table and the global lock control block. The process address table contains pointers to the main memory location for each process control block. Parenthetically, each process control block holds all of the central information required for dispatching, save areas, and process control. Relatedly, a lock control block is used to synchronize the use of various resources. Also, a display refresh buffer is set out which contains data displayed by way of a video read head. The dialog resources are controlled respectively by a display control block and a keyboard control block. The display control block holds the required information for display control while the keyboard control block holds keyboard status and translation tables.

Referring now to FIG. 4, there is shown a typical process control block expanded to include dialog resource allocation information. In this environment, each PCB has a unique keyboard and display control block portions in order to maintain complete environmental isolation. FIG. 4 typifies a PCB. In this regard, the four left-most characters IPCB designate that the remaining character string is a pointer while the last four characters constitute the pointer description. Of interest are the pointers to the dialog resources and resource control blocks such as the display buffer (BDSB), display control block (BIDRR), and keyboard control block (BIUCK). Of particular interest are pointers BPSWL and BNSWL which define the predecessor and successor processes formed in the swap queue.

The Dialog Resource Swap List

Figure 5:
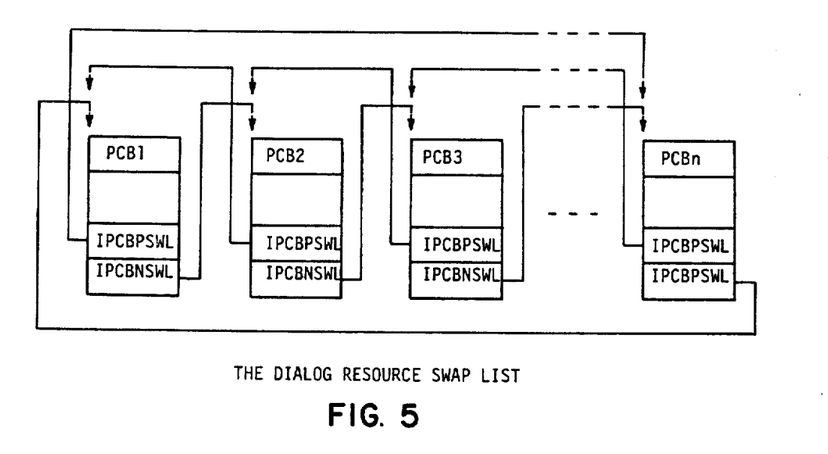
FIG. 5 shows a linked list representation among process control blocks queued against dialog resource.
Figure 6:
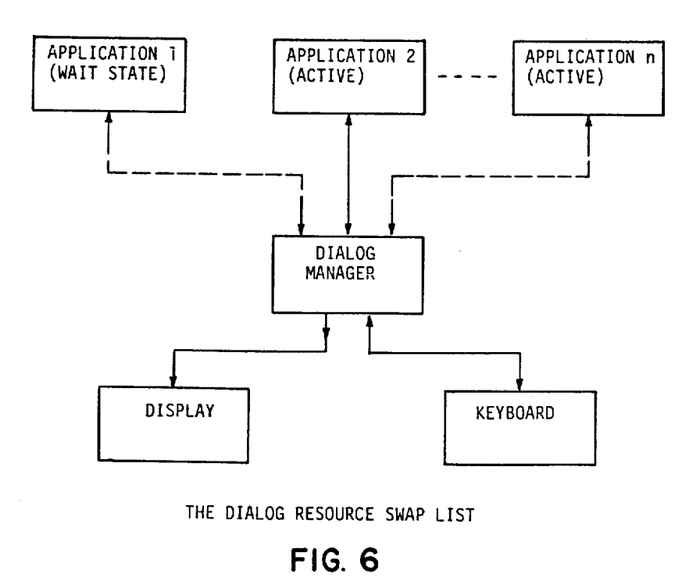
FIG. 6 shows the selection relationship between the user as dialog manager and the coupling of the dialog resource to one of n apparent asynchronous concurrently executing processes.

Referring now to FIGS. 5 and 6, there is shown different characterizations of the swap list and its relationship to the operating system. The swap list or queue of process descriptions calling for dialog resource access is a list linked together by way of the BPSWL and BNSWL pointers. The initial PCB forming the list is known as the ANCHOR and an indicator is set in its description to identify status. Significantly, dialog resources such as the display may be shared among a number of PCBs. However, a resource such as a keyboard may be owned by only one PCB (process) at a time. The process that is using the keyboard at any instant has an indicator in its counterpart PCB identifying this status. It should be noticed that the resource swap list forms a double linked circular list. This linkage permits movement in either direction and provides access to the necessary control information for swapping of the dialog resources. An operating system function to be subsequently described provides for the necessary support to effectuate list building and the swap of the dialog resources. It is invoked with a single keystroke. This function is always active and independent of keyboard ownership. Lastly, the swap function determines which next available process will acquire the dialog resources.

FIG. 6 is another conceptual view of the invention. The operator managing the key can switch the display keyboard from the concurrently executing processes in much the same manner as a television channel selector assigned the video screen to one of n channels simultaneously broadcasting. For many years, channel selection switches have been serial circular switches such that a movement from channel 2 to channel 9 involved stepping through successively channels 3 through 8. This is a parallel to the round robin linkage arrangement among the processes queued against the dialog resources.

Building a Resource Swap Queue

Figure 7:
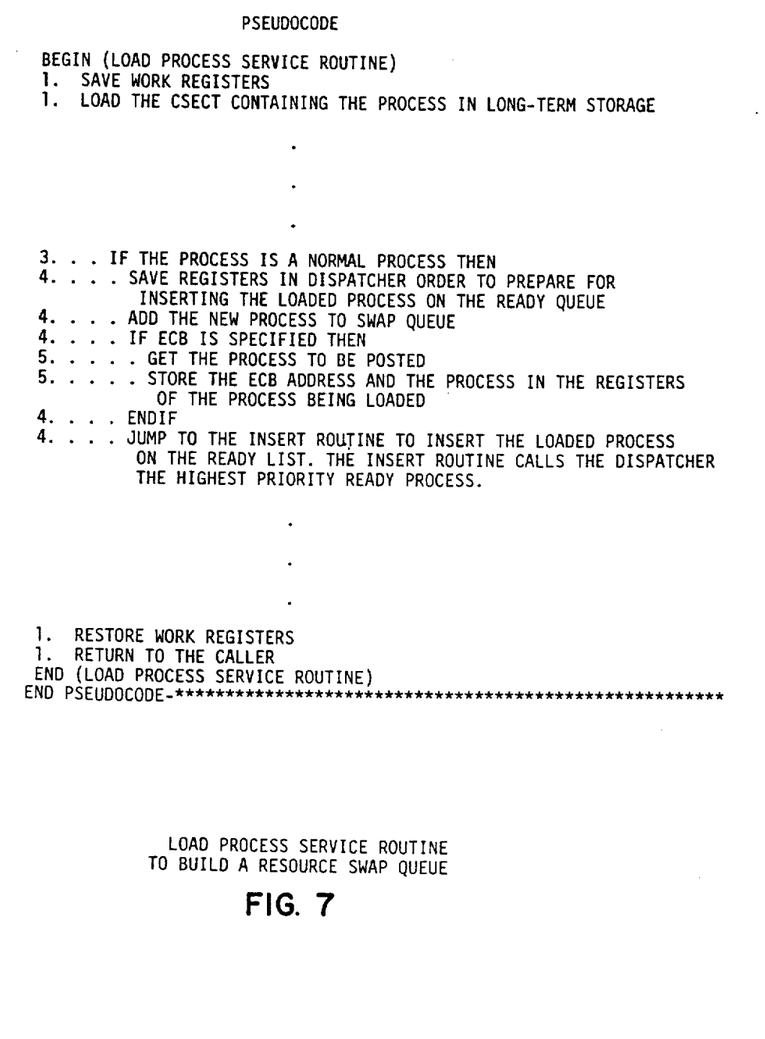
FIG. 7 is a pseudocode representation for building a resource swap queue.

Referring now to FIG. 7, there is shown a pseudocode representation of an operating system load process service routine used to dynamically load one or more processes and prepare them for execution. Each process however must have been previously defined through another macro. All of the pseudocode expressions are written in structured format. The lefthand margin numerals indicate the nesting level of the counterpart statement. Certain abbreviations should be explained. PAT is the process address table. ISP is a processing routine that controls the interrupt servicing.

The pseudocode may be implemented in any convenient high level language such as PASCAL. However, for operating efficiency, an assembly level language should be used. Since dynamic loading implementation is believed well known, further description of it is not required.

Hot Key Service Routine

Figure 8:
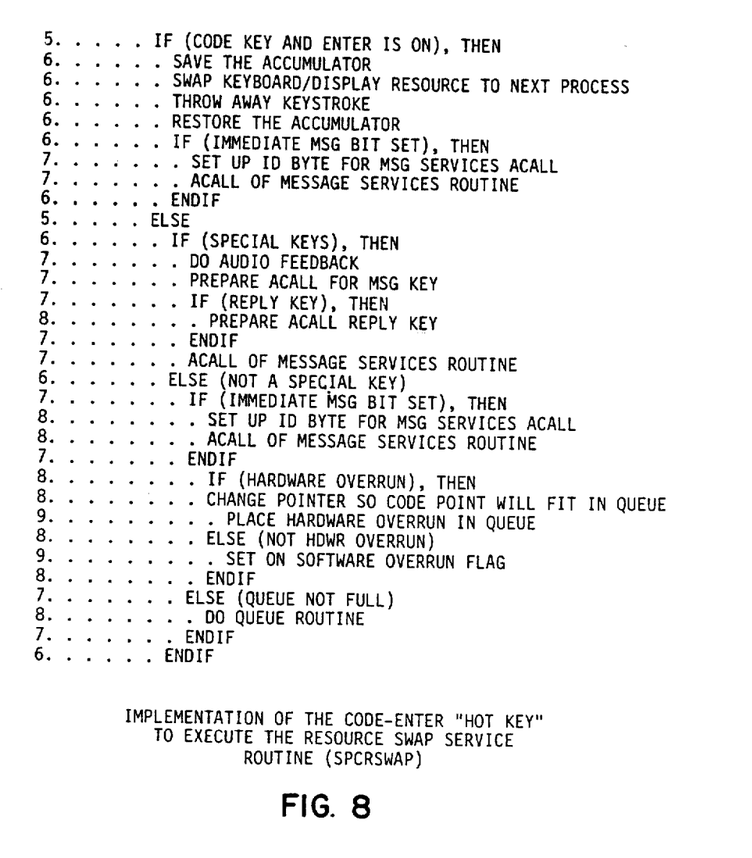
FIG. 8 is a pseudocode representation setting out the operating system response to a user swap queue actuation.

Referring now to FIG. 8, there is shown a pseudocode fragment of the key service routine responsive to the hardware interrupt set by actuation of the swapping key. The most significant elements are the first three statements which initiate saving the accumulator content and invoking the swap processing fragment set out in FIG. 9.

Resource Swap Service Routine

Figure 9:
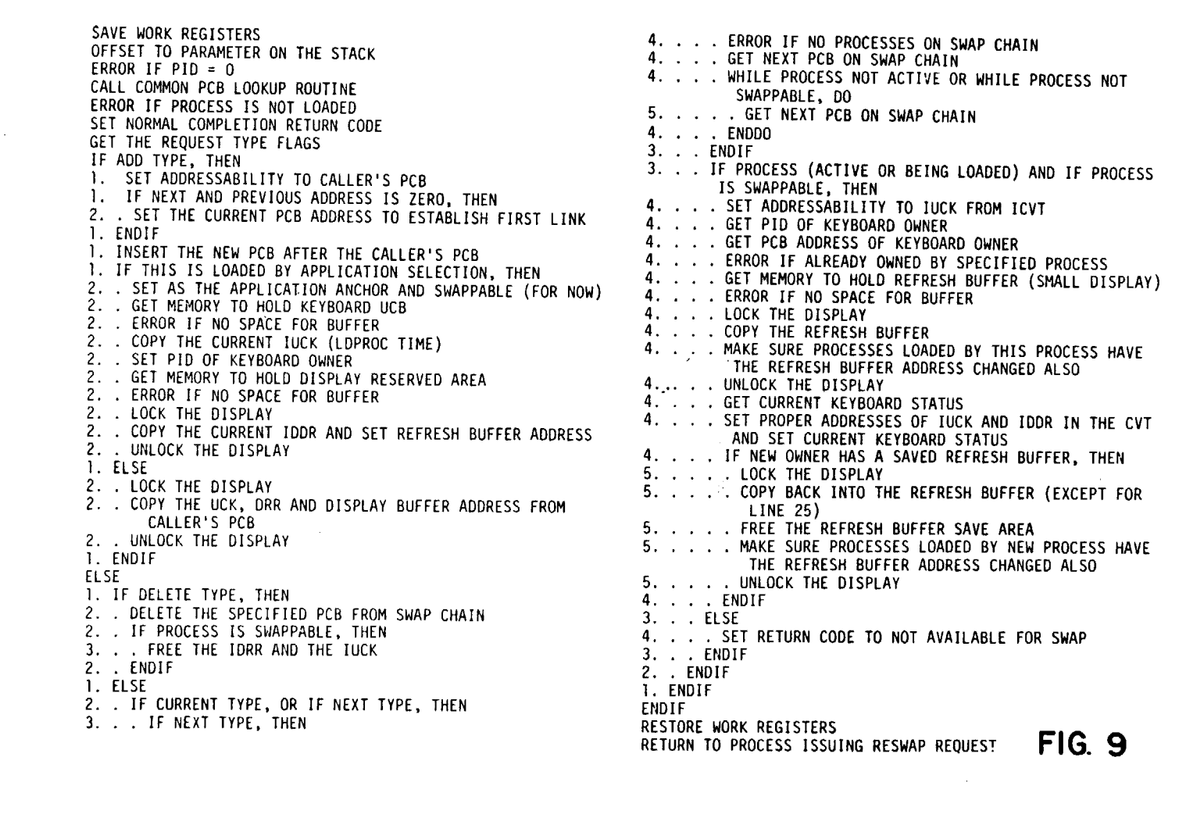
FIG. 9 depicts a machine pseudocode keystroke response to effectuate the dialog resource swap.

Referring now to FIG. 9, there is shown a pseudocode representation of the service routine to effectuate assigning access to dialog resources to an executing one of the processes listed in the swap queue. This swap routine ascertains the validity of the process and implements the selection orders of processes in the queue by either adding/deleting of a process to/from the resource swap queue, swapping resources from the current to the next process in the queue or swapping resources to a specified (current) process. This pseudocode fragment consists principally of nested IF-THEN-ELSE statements for either list adding, deleting or swapping. In this regard, the first level of nesting treats the addition and deletion of a process from the list while the swapping sequence is treated as a series of IF-THEN-ELSE statements at the third level of nesting in the last third of the sequence. This starts with testing whether the process is active and is swappable.

As previously mentioned, implementation should be in an assembly language to permit direct access to control data structures at a bit minipulation level. Implementation could be in a higher level language such as PASCAL if a performance penalty was endurable. The flow of control is unambiguously set out and does not require additional comment.

Figure 10:
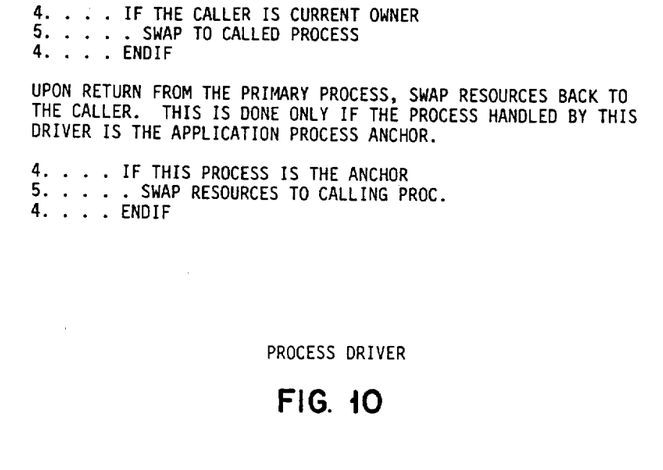
FIG. 10 shows a driver for pass control to a designated process type.

Referring now to FIG. 10, there is shown a process driver in pseudocode. This governs cycling back to the beginning of the list or anchor.

It will be further understood by those skilled in this art that various changes in form and details may be made therein without departing from the spirit and scope of the invention. For example, the set of resources subject to real time switching might be extended. Further, list structures other than circular may be employed.

I claim:

1. A method for the real time reassignment of input or output means coupling a multi-tasking processor in which switching from task to task is selectively invoked by interrupts including interrupts invoked through the input means, comprising the steps of:

building a linked list of identities of those tasks which call the input or output means and embedding pointers defining a dispatching order there among in counterpart task descriptions; and responsive to an interrupt invoked through the input means, reassigning the input or output means from the task currently executing to the next task in order on the linked list;

whereby assignment of the input or output means is rotatable among only those tasks in linked list order.

2. A method for real time reassignment of input or output means coupling a multi-tasking word processor in which switching from process to process is selectively invoked by interrupts including interrupts invoked through the input means, comprising the steps of:

forming a queue of processes requiring input or output means and embedding pointers defining the dispatching order among the queued processes in the counterpart process description; and responsive to an interrupt through the input means, causing a dispatcher to save the state vector of any process currently executing upon the processor in its process description, retrieve a state vector of the next process in the queue in pointer order from the process description of said next process, and transfer control to said next process.

3. A method according to claim 2, wherein the input or output means respectively include a keyboard or display.

* * * * *